(12) United States Patent
Sato (10) Patent No.: US 7,408,725 B2
(45) Date of Patent: *Aug. 5, 2008

(54) SINGLE FOCUS LENS (75) Inventor: Kenichi Sato, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/528,446

(22) Filed: Sep. 28, 2006

(65) Prior Publication Data
US 2007/0070526 A1   Mar. 29, 2007

(30) Foreign Application Priority Data
Sep. 29, 2005   (JP)   ............................ P2005-284712

(51) Int. Cl.
G02B 9/14 (2006.01)
G02B 13/18 (2006.01)
G02B 3/02 (2006.01)

(52) U.S. Cl. ...................................... 359/785; 359/716

(58) Field of Classification Search ................. 359/716, 359/753, 784, 785, 789
See application file for complete search history.

(56) References Cited

U.S. PATENT DOCUMENTS

| 6,992,840 B2 | 1/2006 | Takeuchi et al. |
| 2004/0190162 A1 | 9/2004 | Sato |
| 2005/0041306 A1 | 2/2005 | Matsuo |
| 2005/0094292 A1 | 5/2005 | Cahall et al. |

FOREIGN PATENT DOCUMENTS

| CN | CN-1512197 A | 7/2004 |
| EP | 1 562 061 A1 | 8/2005 |
| JP | 10-48516 A | 2/1998 |

Primary Examiner—Alicia M Harrington
(74) Attorney, Agent, or Firm—Birch, Stewart, Kolasch & Birch, LLP (57) ABSTRACT A single focus lens is provided and includes: in order from an object side of the single focus lens, a first lens having positive power and having a convex surface on the object side; a second lens of a negative meniscus lens and having a concave surface of the object side on its paraxial axis; and a third lens of an aspherical lens having a convex surface on the object side on its paraxial axis. The single focus lens satisfies conditions specified in the specification.

26 Claims, 8 Drawing Sheets

| BASIC LENS DATA OF EXAMPLE 1 | | | | |
|---|---|---|---|---|
| SURFACE NUMBER Si | RADIUS Ri OF CURVATURE | SURFACE INTERVAL Di | REFRACTIVE INDEX Ndj | ABBE NUMBER $\nu$dj |
| *1 | 1.8526 | 1.000 | 1.49700 (NdA) | 81.6 ($\nu$dA) |
| *2 | 22.8715 | 0.819 | | |
| *3 | -1.8755 | 0.700 | 1.58362(NdB) | 30.2 ($\nu$dB) |
| *4 | -7.8003 | 0.100 | | |
| *5 | 1.7928 | 1.300 | 1.49023 | 57.5 |
| *6 | 2.8856 | 1.540 | | |
| 7 | ∞ | 0.300 | 1.51680 | 64.2 |
| 8 | ∞ | | | |

(*: ASPHERICAL SURFACE)  (f=4.95mm, FNO.=3.2, 2$\omega$=67.2°)

FIG. 4

| ASPHERICAL SURFACE DATA OF EXAMPLE 1 |||| 
|---|---|---|---|
| COEFFICIENT | SURFACE NUMBER |||
|  | 1ST SURFACE | 2ND SURFACE | 3RD SURFACE |
| K | 2.73559 | 1.00000 | 2.76632 |
| $A_3$ | -2.85006E-02 | 4.09933E-02 | -4.01460E-02 |
| $A_4$ | 1.65455E-01 | -1.56349E-01 | 1.11656E-01 |
| $A_5$ | -5.88495E-01 | 2.73825E-01 | -5.81201E-03 |
| $A_6$ | 6.67491E-01 | -2.89223E-01 | -7.84214E-02 |
| $A_7$ | -6.96071E-02 | 9.03378E-02 | 3.28318E-02 |
| $A_8$ | -5.61507E-01 | 7.59388E-02 | 6.56035E-02 |
| $A_9$ | 4.82913E-01 | -6.99170E-02 | 2.20053E-02 |
| $A_{10}$ | -1.60723E-01 | -3.73957E-03 | -4.44707E-02 |
|  | 4TH SURFACE | 5TH SURFACE | 6TH SURFACE |
| K | -5.70331 | -18.54881 | -8.3795011 |
| $A_3$ | -2.77945E-01 | -1.40871E-01 | 5.63868E-02 |
| $A_4$ | 6.37225E-02 | 1.63887E-03 | -1.35209E-01 |
| $A_5$ | 7.52775E-02 | 1.96827E-02 | 6.61984E-02 |
| $A_6$ | -9.59982E-03 | 7.63387E-03 | -5.27572E-03 |
| $A_7$ | -1.34306E-02 | -3.17189E-03 | -6.36361E-03 |
| $A_8$ | 1.61092E-02 | -1.24577E-03 | 5.64873E-04 |
| $A_9$ | 1.33446E-02 | 1.17438E-03 | 8.82212E-04 |
| $A_{10}$ | -1.11957E-02 | -3.21290E-04 | -2.16113E-04 |

FIG. 5

| BASIC LENS DATA OF EXAMPLE 2 | | | | |
|---|---|---|---|---|
| SURFACE NUMBER Si | RADIUS Ri OF CURVATURE | SURFACE INTERVAL Di | REFRACTIVE INDEX Ndj | ABBE NUMBER $\nu$dj |
| *1 | 1.8368 | 0.90 | 1.48749 (NdA) | 70.4 ($\nu$dA) |
| *2 | 27.9006 | 0.92 | | |
| *3 | -1.8755 | 0.70 | 1.58362 (NdB) | 30.2 ($\nu$dB) |
| *4 | -7.6400 | 0.10 | | |
| *5 | 1.8389 | 1.30 | 1.49023 | 57.5 |
| *6 | 2.7393 | 1.56 | | |
| 7 | ∞ | 0.30 | 1.51680 | 64.2 |
| 8 | ∞ | | | |

(*: ASPHERICAL SURFACE)   (f=5.10mm, FNO.=3.2, 2$\omega$=65.9°)

FIG. 6

| ASPHERICAL SURFACE DATA OF EXAMPLE 2 | | | |
|---|---|---|---|
| COEFFICIENT | SURFACE NUMBER | | |
| | 1ST SURFACE | 2ND SURFACE | 3RD SURFACE |
| K | 2.63118 | 1.00000 | 2.76632 |
| $A_3$ | -3.33072E-02 | 3.85337E-02 | -4.01460E-02 |
| $A_4$ | 1.68608E-01 | -1.55868E-01 | 1.11656E-01 |
| $A_5$ | -5.77674E-01 | 2.72714E-01 | -5.81200E-03 |
| $A_6$ | 6.63729E-01 | -2.87782E-01 | -7.84214E-02 |
| $A_7$ | -8.36208E-02 | 8.99785E-02 | 3.28318E-02 |
| $A_8$ | -5.66838E-01 | 7.45184E-02 | 6.56035E-02 |
| $A_9$ | 4.97742E-01 | -6.93194E-02 | 2.20053E-02 |
| $A_{10}$ | -1.62913E-01 | -5.73029E-03 | -4.44707E-02 |
| | 4TH SURFACE | 5TH SURFACE | 6TH SURFACE |
| K | -21.72679 | -19.02649 | -8.07959 |
| $A_3$ | -2.76602E-01 | -1.44787E-01 | 5.56670E-02 |
| $A_4$ | 6.61208E-02 | 1.26329E-03 | -1.36019E-01 |
| $A_5$ | 7.49896E-02 | 1.99239E-02 | 6.64300E-02 |
| $A_6$ | -1.05113E-02 | 7.69290E-03 | -5.11014E-03 |
| $A_7$ | -1.42387E-02 | -2.97408E-03 | -6.37116E-03 |
| $A_8$ | 1.57877E-02 | -1.23745E-03 | 5.46786E-04 |
| $A_9$ | 1.32000E-02 | 1.16431E-03 | 8.80824E-04 |
| $A_{10}$ | -1.10226E-02 | -3.34067E-04 | -2.16815E-04 |

FIG. 7

| VALUES OF PARAMETERS OF CONDITION FORMULAE | | |
|---|---|---|
| PARAMETER | EXAMPLE 1 | EXAMPLE 2 |
| f1/f OF CONDITION FORMULA (1) | 0.80 | 0.78 |
| νdA OF CONDITION FORMULA (2) | 81.6 | 70.4 |
| νdB OF CONDITION FORMULA (3) | 30.2 | 30.2 |
| NdA OF CONDITION FORMULA (4) | 1.497 | 1.4875 |
| NdB OF CONDITION FORMULA (5) | 1.5836 | 1.5836 |
| L/D OF CONDITION FORMULA (6) | 1.71 | 1.72 |
| RA/f OF CONDITION FORMULA (7) | 0.37 | 0.36 |

SINGLE FOCUS LENS

BACKGROUND OF THE INVENTION

1. Field of the Invention

The present invention relates to a single focus lens that is suitable for use in small apparatus having an imaging function such as cell phones with a camera, PDAs (personal digital assistants), and digital still cameras.

2. Description of Background Art

Imaging apparatus such as digital still cameras employ an imaging device such as a CCD (charge-coupled device) sensor or a CMOS (complementary metal oxide semiconductor) sensor. In recent years, such imaging devices have been miniaturized to a large extent. Accordingly, imaging apparatus main bodies and lenses mounted thereon have come to be required to be reduced in size and weight. On the other hand, in recent years, imaging devices having a large number of pixels have been developed to attain high image quality and, accordingly, lens systems have come to be required to be high in such performance as resolution and contrast.

An example of imaging lenses used in such imaging apparatus is one disclosed in JP-A-10-48516. JP-A-10-48516 discloses an imaging lens consisting of first to third lenses that are arranged in this order from the object side (three-lens system). In this imaging lens, the first lens is small in power and an aperture stop is disposed between the second lens and the third lens.

As described above, recent imaging devices have been miniaturized and increased in the number of pixels and, accordingly, imaging lenses have come to be required to exhibit a high resolution and be high in the degree of compactness. Although the imaging lens of JP-A-10-48516 attains certain levels of performance and compactness with a small number of lenses (three lens system), development of a more compact, higher-performance lens system is desired.

SUMMARY OF THE INVENTION

An object of an illustrative, non-limiting embodiment of the invention is to provide a single focus lens, which is a compact, high-performance lens system though the number of lenses is small.

A single focus lens according to one aspect of the invention includes: in order from an object side of the single focus lens, a first lens having positive power and having a convex surface on the object side; a second lens of a negative meniscus lens and having a concave surface of the object side on its paraxial axis; and a third lens of an aspherical lens having a convex surface on the object side on its paraxial axis, wherein the single focus lens satisfies conditions (1) to (7):

$$0.6 < f1/f < 1.5 \quad (1)$$

$$69 < vdA \quad (2)$$

$$24 < vdB < 32 \quad (3)$$

$$NdA < 1.55 \quad (4)$$

$$1.48 < NdB < 1.65 \quad (5)$$

$$L/D < 1.8 \quad (6)$$

$$0.30 < RA/f < 0.40 \quad (7)$$

wherein f represents a focal length of the single focus lens;
f1 represents a focal length of the first lens;
vdA represents Abbe number of the first lens;
vdB represents Abbe number of the second lens;
NdA represents a refractive index at the d-line of the first lens;
NdB represents a refractive index at the d-line of the second lens;
RA represents a paraxial radius of curvature of an object-side surface of the first lens;
L represents a distance along an optical axis between the object-side surface of the first lens and an image-forming position; and
D represents a maximum image height.

The single focus lens according to one aspect of the invention may further includes a stop which is disposed, on the optical axis, on the object side of an image-side surface of the first lens.

A single focus lens according to one aspect of the invention is implemented as a compact, high-performance lens system is realized though the number of lenses is as small as three by securing sufficient compactness by satisfying the condition formulae (1), (6), and (7) and optimizing the lens materials of the first lens and the second lens by satisfying the condition formulae (2), (3), (4), and (5).

BRIEF DESCRIPTION OF THE DRAWINGS

The features of the invention will appear more fully upon consideration of the exemplary embodiment of the invention, which are schematically set forth in the drawings, in which:

FIGS. 8A-8C show the spherical aberration, astigmatism, and distortion, respectively; FIGS. 9A-9CC show the spherical aberration, astigmatism, and distortion, respectively.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, a single focus lens is provided with the first lens G1 which has positive power and whose object-side surface is a convex surface, the second lens which is a negative meniscus lens and whose object-side surface is a concave surface on its paraxial axis, and the third lens which is an aspherical lens and whose object-side surface is a convex surface on its paraxial axis in such a manner that they are arranged in this order from the object side. And sufficient compactness is secured and the lens materials of the first lens and the second lens are optimized by satisfying the prescribed condition formulae. As a result, a compact, high-performance lens system can be realized though the number of lenses is as small as three.

Exemplary embodiments of the present invention will be hereinafter described in detail with reference to the drawings.

Figure 1:
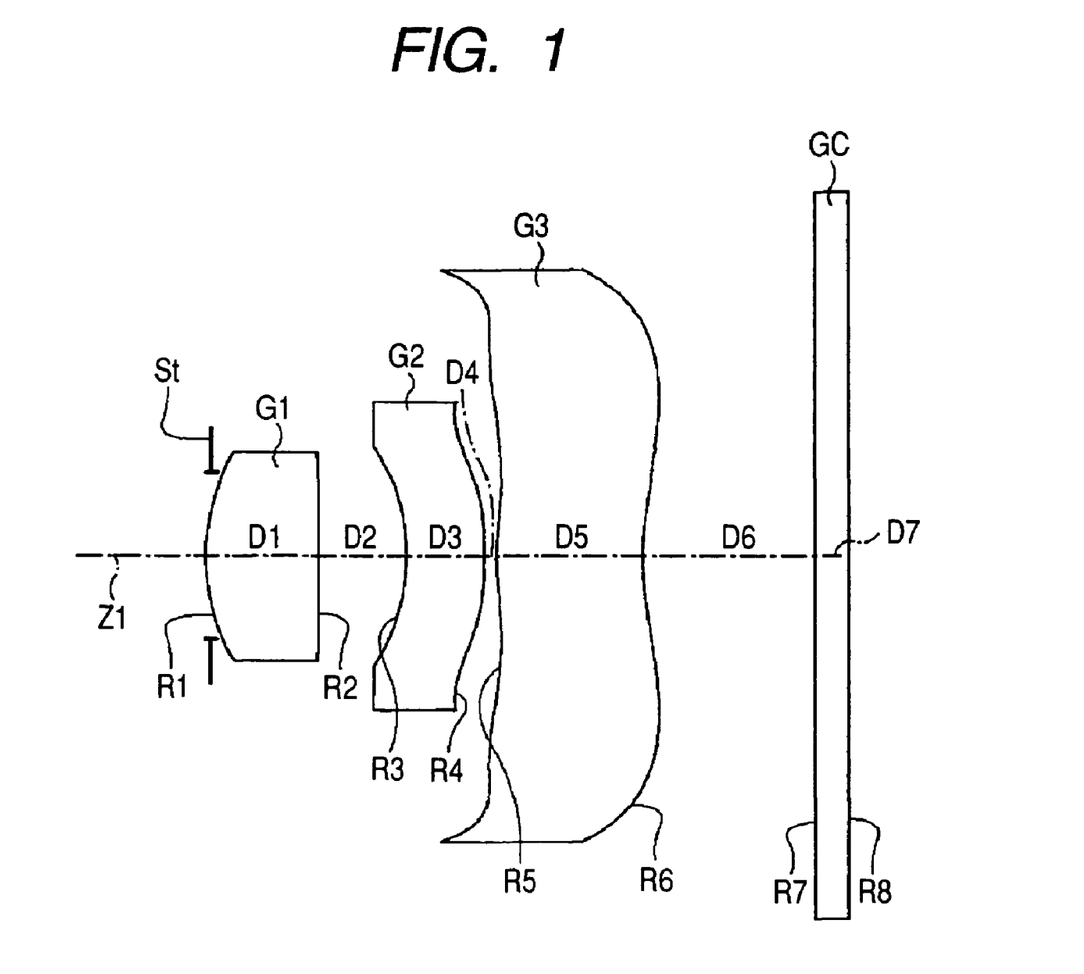
FIG. 1 is a sectional view of a single focus lens (first exemplary configuration) according to an exemplary embodiment of the present invention.
Figure 2:
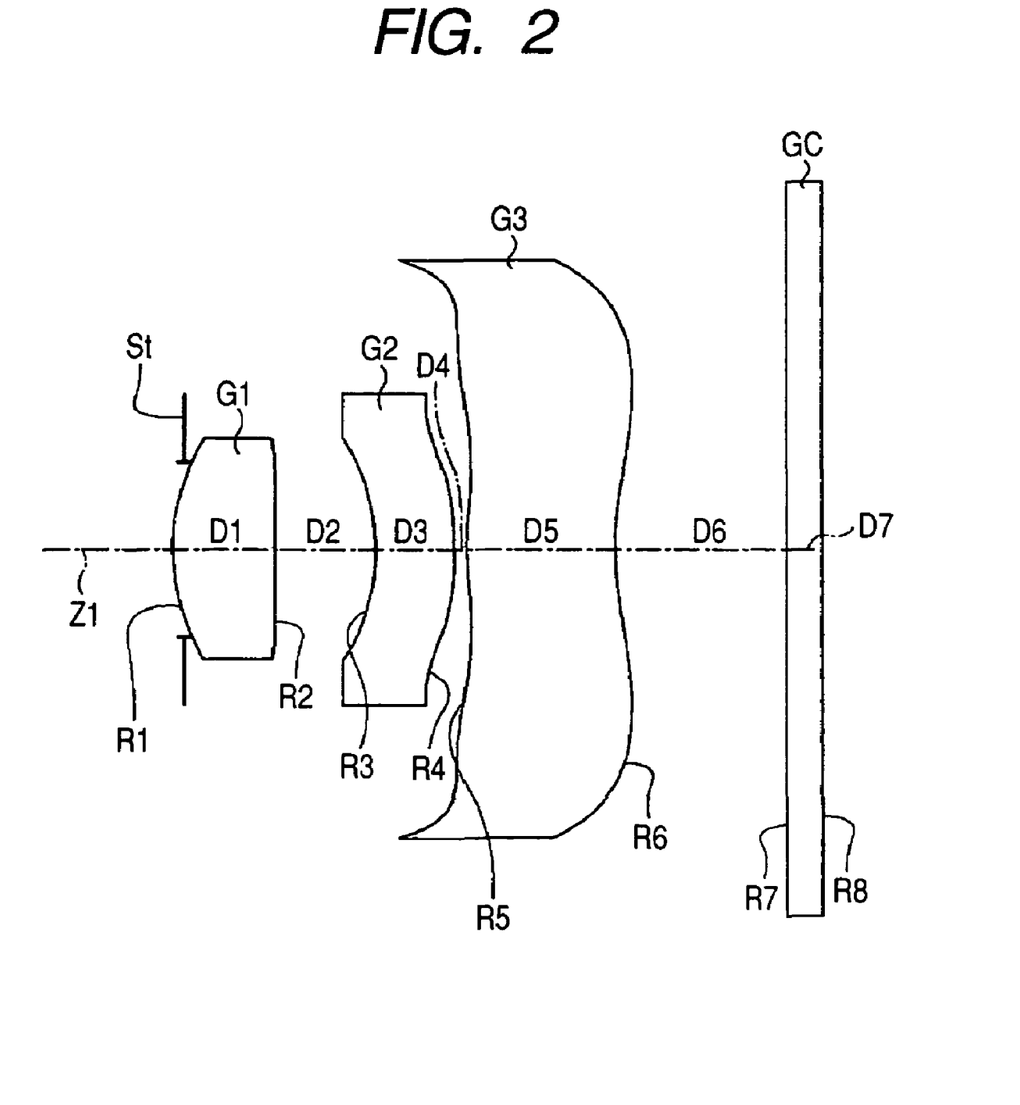
FIG. 2 is a sectional view of another single focus lens (second exemplary configuration) according to an exemplary embodiment of the invention.
Figure 3:
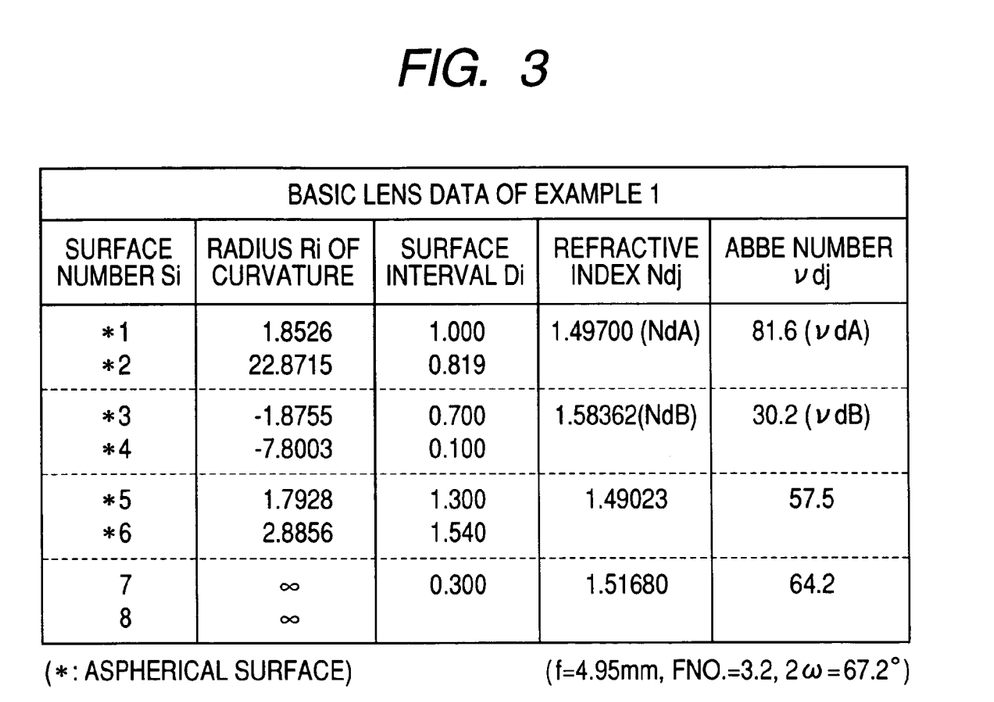
FIG. 3 shows basic lens data of a single focus lens of Example 1.
Figure 4:
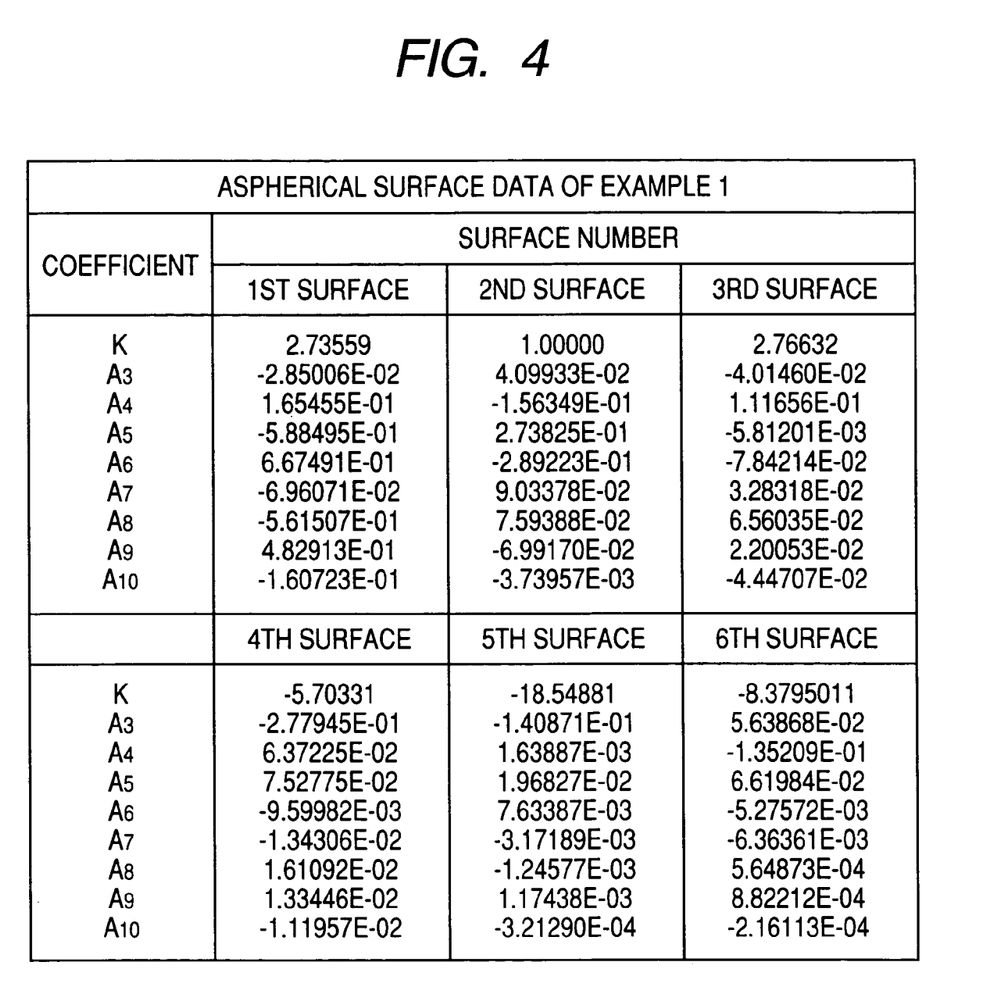
FIG. 4 shows data relating to aspherical surfaces of the single focus lens of Example 1.
Figure 5:
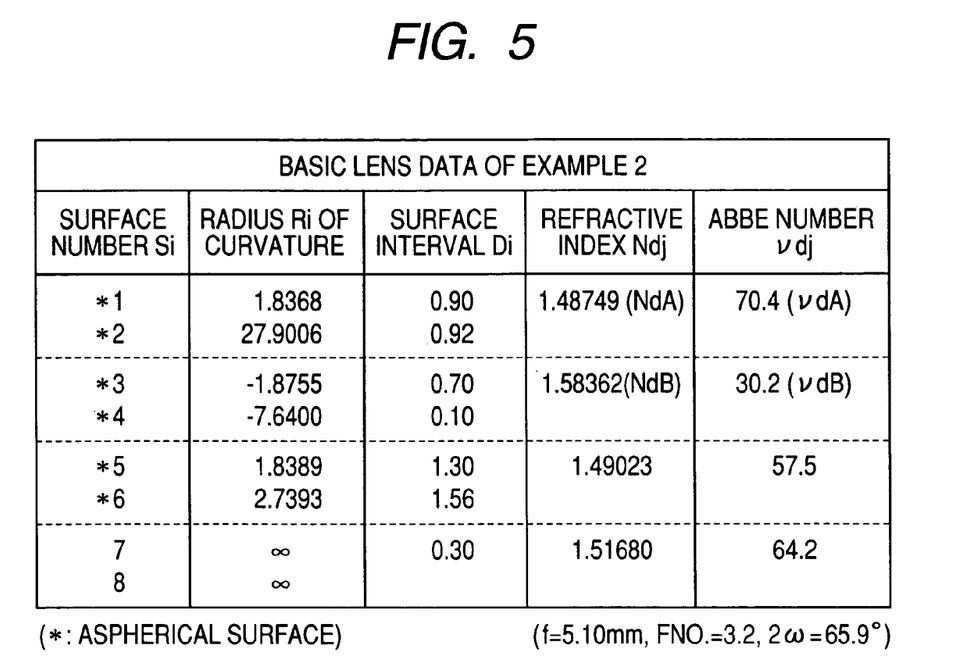
FIG. 5 shows basic lens data of a single focus lens of Example 2.
Figure 6:
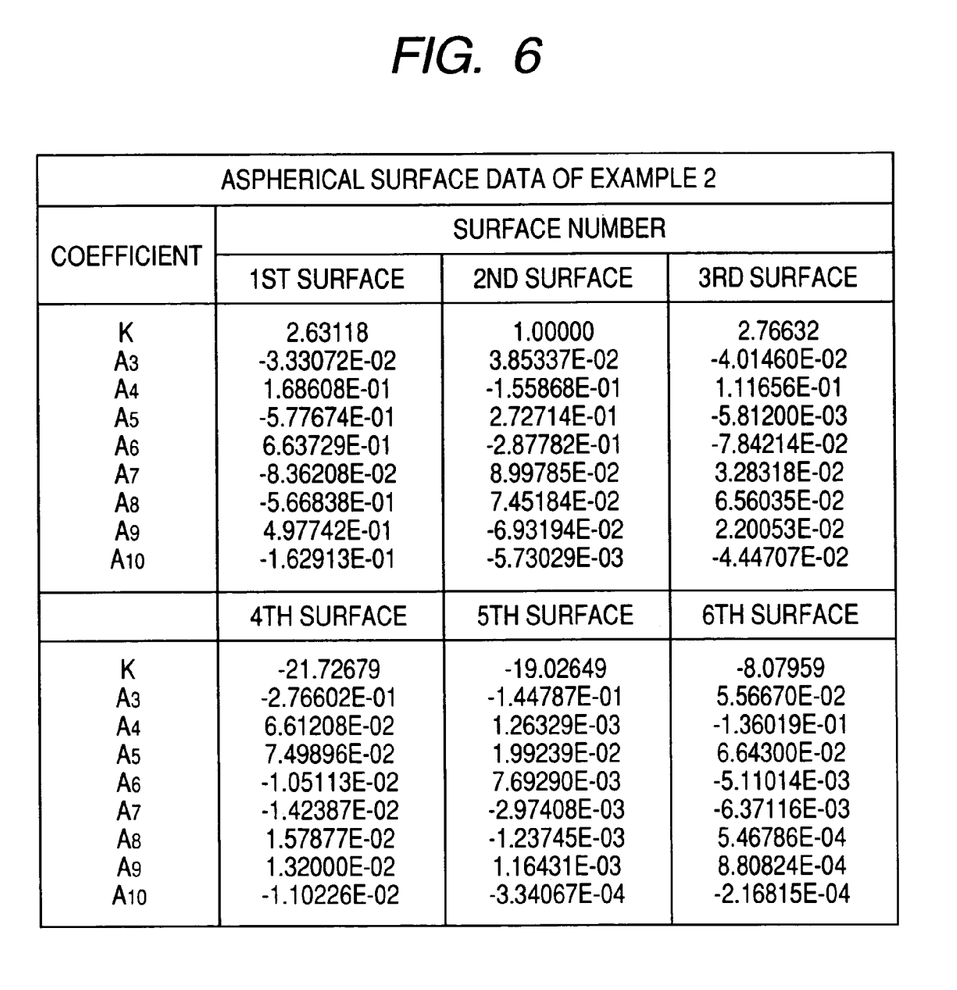
FIG. 6 shows data relating to aspherical surfaces of the single focus lens of Example 2.

FIG. 1 shows a single focus lens (first exemplary configuration) according to the embodiment of the invention. This exemplary configuration corresponds to a lens configuration according to a first numerical value Example (FIGS. 3 and 4; described later). FIG. 2 shows another single focus lens (second exemplary configuration). The exemplary configuration of FIG. 2 corresponds to a lens configuration according to a second numerical value Example (FIGS. 5 and 6; described later). In FIGS. 1 and 2, symbol Ri represents the radius of curvature of the ith surface (i=1 to 8) as numbered from the object side to the image side (image formation side), the radius of curvature of the object-side end surface being represented by R1. Symbol Di represents the surface interval on the optical axis Z1 between the ith surface and the (i+1)th surface. The two exemplary configurations have the same basic configuration, and hence the configuration of the single focus lens shown in FIG. 1 will be described below.

This single focus lens is suitable for use in small apparatus having an imaging function such as PDAs (personal digital assistants), video cameras, and digital still cameras. This single focus lens is provided with a first lens G1, a second lens G2, and a third lens G3 which are arranged along the optical axis Z1 in this order from the object side. An aperture stop St is disposed on the optical axis Z1 on the object side of the image-side surface of the first lens G1. It is preferable that the aperture stop St be disposed on the optical axis Z1 between the object-side surface and the image-side surface of the first lens G1.

An imaging device such as a CCD sensor (not shown) is disposed in the image-forming plane (imaging plane) of this single focus lens. Various optical members GC may be disposed between the third lens G3 and the imaging plane in accordance with the configuration of a camera to which the lens is attached. For example, a plate-like optical member GC such as a cover glass for imaging surface protection or one of various optical filters may be disposed there.

It is preferable that the first lens G1 be an aspherical lens made of a glass material. It is preferable that each of the second lens G2 and the third lens G3 be an aspherical lens made of a plastic material. The first lens G1 has positive power because the object-side surface is a convex surface. The second lens G2 is a negative meniscus lens in which the object-side surface is a concave surface on its paraxial axis. The third lens G3 is an aspherical lens in which the object-side surface is a convex surface on its paraxial axis.

It is preferable that the object-side surface of the third lens G3 be shaped in such a manner that its positive power decreases as the position goes outward. It is preferable that the image-side surface of the third lens G3 be a concave surface (i.e., recessed) on its paraxial axis, its negative power decrease as the position goes away from the center, and its power turn positive at a certain position further away from the center.

This single focus lens satisfies the following condition formulae, where f is the focal length of the entire lens, f1 is the focal length of the first lens G1, vdA is the Abbe number of the first lens G1, vdB is the Abbe number of the second lens G2, NdA is the refractive index at the d-line of the first lens G1, NdB is the refractive index for at the d-line of the second lens G2, RA is the paraxial radius of curvature of the object-side surface of the first lens G1, L is the distance along the optical axis Z1 between the object-side surface of the first lens G1 and the image-forming position, and D is the maximum image height. The parameter L is such that the thickness of the optical member GC such as a cover glass is air-converted.

$$0.6 < f1/f < 1.5 \tag{1}$$

$$69 < vdA \tag{2}$$

$$24 < vdB < 32 \tag{3}$$

$$NdA < 1.55 \tag{4}$$

$$1.48 < NdB < 1.65 \tag{5}$$

$$L/D < 1.8 \tag{6}$$

$$0.30 < RA/f < 0.40 \tag{7}$$

Next, the workings and advantages of the single focus lens having the above configuration will be described.

This single focus lens is implemented as a compact, high-performance lens system though the number of lenses is as small as three, because, as described below, sufficient compactness is attained because of satisfaction of the condition formulae (1), (6), and (7) and the refractive index and the dispersion characteristic of the lens material of each of the first lens G1 and the second lens G2 are optimized because of satisfaction of the condition formulae (2), (3), (4), and (5).

The condition formula (1) relates to the focal length f1 of the first lens G1. The parameter f1/f being out of the above numerical value range is not preferable, because the total length becomes too long if f1/f is greater than the above numerical value range and the pupil becomes too short if f1/f is smaller than the above numerical value range. The condition formula (6) relates to the ratio of the total optical length L along the optical axis Z1 to the maximum image height D. If the ratio L/D is greater than the above numerical value range, the total lens system cannot be made sufficiently compact. The condition formula (7) relates to the radius RA of curvature of the front surface of the first lens G1. The parameter RA/f being out of the above numerical value range is not preferable, because it is difficult to make the lens total length sufficiently short if RA/f is greater than the above numerical value range and it is difficult to correct for the spherical aberration and the curvature of field if RA/f is smaller than the above numerical value range. In this single focus lens, the power is made relatively large by decreasing the radius R1 of curvature of the front surface of the first lens G1 and the total length is thereby shortened.

The condition formulae (2) and (4) relate to the characteristics of the lens material of the first lens G1. The chromatic aberration and the curvature of field can be corrected for properly by using a lens material having a large Abbe number and a small refractive index for the first lens G1 having positive power so that the condition formulae (2) and (4) are satisfied. The condition formulae (3) and (5) relate to the characteristics of the lens material of the second lens G2. If vdB and NdB are within the above numerical value ranges, the combination of the first lens G1 and the second lens G2 can be given necessary and sufficient performance in terms of the color aberration and the curvature of field. The third lens G3 can be given good performance by forming it with a material such as an acrylic resin or a cycloolefin polymer that has an Abbe number of 55 to 60, is inexpensive and easy to acquire, and is optically stable (e.g., low in strain).

The total length, including the aperture stop St, of this single focus lens can be shortened by disposing the aperture stop St on the optical axis Z1 on the object side of the image-side surface of the first lens G1, preferably on the optical axis Z1 between the object-side surface and the image-side surface of the first lens G1. Furthermore, in this single focus lens, great aberration correcting effects can be obtained by employing proper aspherical surfaces as the surfaces of each lens. In particular, greater effects of correcting for aberrations including the curvature of field can be obtained by properly designing each aspherical surface (more specifically, the shapes of its paraxial portion and peripheral portion) of the third lens G3.

As described above, the single focus lens according to the embodiment is implemented as a compact, high-performance lens system though the number of lenses is as small as three by, for example, optimizing the lens materials of and the power allocations to the first lens G1 and the second lens G2 so that the prescribed condition formulae are satisfied.

Next, specific numerical value Examples corresponding to the above single focus lenses according to the embodiment will be described. Two numerical value Examples (Examples 1 and 2) will be described together below.

FIGS. 3 and 4 show specific lens data (Example 1) corresponding to the configuration of the single focus lens shown in FIG. 1. More specifically, FIG. 3 shows basic lens data and FIG. 4 shows data relating to the aspherical surfaces. FIGS. 5 and 6 show specific lens data (Example 2) corresponding to the configuration of the single focus lens shown in FIG. 2. More specifically, FIG. 5 shows basic lens data and FIG. 6 shows data relating to the aspherical surfaces.

In the lens data of each of FIGS. 3 and 5, in the column "surface Si," surface number Si denotes the ith surface (i=1 to 8) of the single focus lens of each Example as numbered from the object side to the image side, the object-side end surface being denoted by S1. In the column "radius Ri of curvature," a value of the radius of curvature of the ith surface as numbered from the object side is shown (symbol Ri is the same as shown in FIGS. 1 and 2). In the column "surface interval Di," a value of the surface interval on the optical axis Z1 between the ith surface Si and the (i+1)th surface Si+1 is shown. The unit of the radius Ri of curvature and the surface interval Di is millimeter (mm). In the columns "refractive index Ndj" and "Abbe number vdj," values of the refractive index and the Abbe number at the d-line (wavelength: 587.6 nm) of the jth optical element (j=1 to 4; including the optical member GC) as numbered from the object side are shown. Each of FIGS. 3 and 5 also shows other various data, that is, values of the paraxial focal length f (mm), the F number (F No.), and the angle 2ω of view (ω: half angle of view) of the entire system.

In the single focus lens of Example 1, the aperture stop St is disposed on the optical axis Z1 at a position that is distant from the object-side surface of the first lens G1 by 0.05 mm to the image side. In the single focus lens of Example 2, the aperture stop St is disposed on the optical axis Z1 at a position that is distant from the object-side surface of the first lens G1 by 0.1 mm to the image side.

In the lens data of FIGS. 3 and 5, symbol "*" that is attached, on the left side, to each surface number denoting a lens surface means that the lens surface is an aspherical surface. In the single focus lens of each Example, both surfaces of each of the first lens G1, the second lens G2, and the third lens G3 are aspherical surfaces. In the basic lens data of FIGS. 3 and 5, the values of the radii of curvature of these aspherical surfaces are values of the radii of curvature of their portions close to the optical axis Z1.

FIGS. 4 and 6 show the data of the aspherical surfaces of the single focus lenses of Examples 1 and 2. As for the numerical values of the aspherical surface data, symbol "E" means that the numerical value following it is an exponent of a power having 10 as a base and the numerical value before "E" is multiplied by the power. For example, "1.0E-02" means $1.0 \times 10^{-2}$.

The data of each aspherical surface are values of the coefficients $A_i$ and K of the following Equation (A) representing an aspherical surface. That is, the parameter Z means the length (mm) of the perpendicular from a point on the aspherical surface having a height h as measured from the optical axis Z1 to the tangential plane to the aspherical surface at its top (the tangential plane is perpendicular to the optical axis Z1). Each aspherical surface of the single focus lens of each Example is represented by effectively using the even-order aspherical coefficients $A_4$, $A_6$, $A_8$, and $A_{10}$ and the odd-order aspherical coefficients $A_3$, $A_5$, $A_7$, and $A_9$:

$$Z = C \cdot h^2 / \{1 + (1 - K \cdot C^2 \cdot h^2)^{1/2}\} + A_3 \cdot h^3 + A_4 \cdot h^4 + A_5 \cdot h^5 + A_6 \cdot h^6 + A_7 \cdot h^7 + A_8 \cdot h^8 + A_9 \cdot h^9 + A_{10} \cdot h^{10} \quad (A)$$

where

Z: depth (mm) of a point on the aspherical surface;

h: distance (mm) between the point on the aspherical surface and the optical axis Z1 (i.e., height of the point);

K: eccentricity;

C: paraxial curvature (=1/R; R: paraxial radius of curvature); and $A_i$: ith-order aspherical coefficient.

Figure 7:
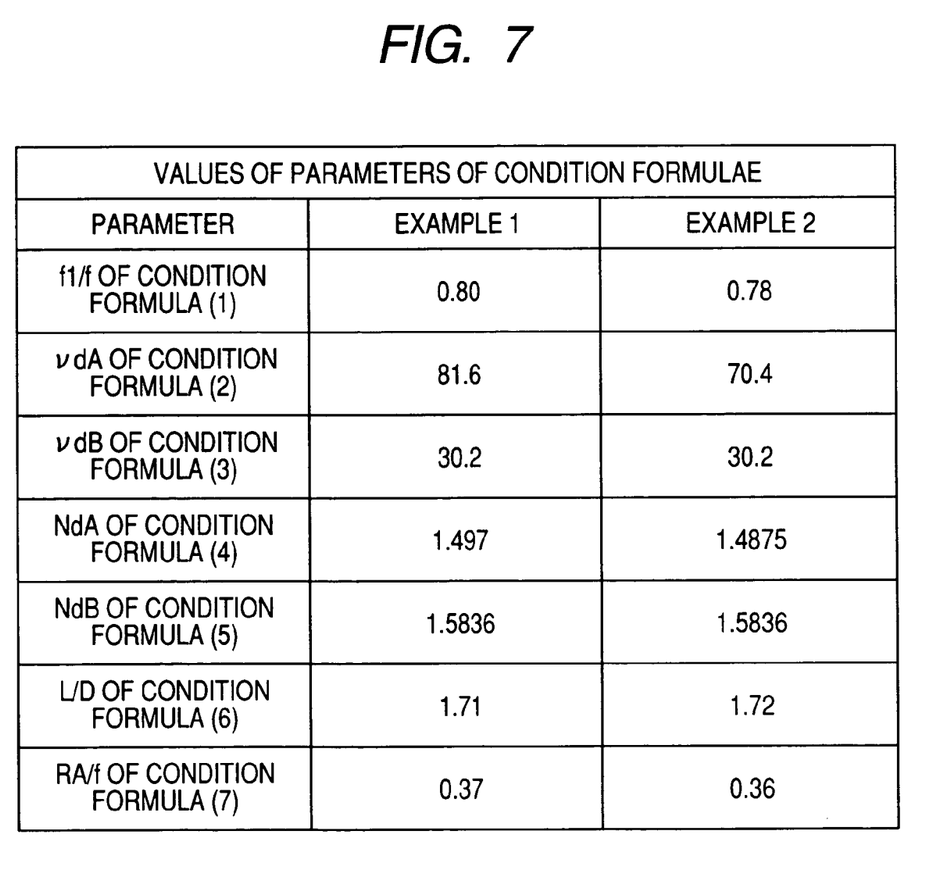
FIG. 7 summarizes, for each Example, values of parameters to which respective condition formulae are directed.

FIG. 7 summarizes, for each Example, values of the parameters to which the respective condition formulae are directed. As seen from FIG. 7, the parameter values of each Example are within the numerical value ranges of the condition formulae, respectively.

Figure 8A:
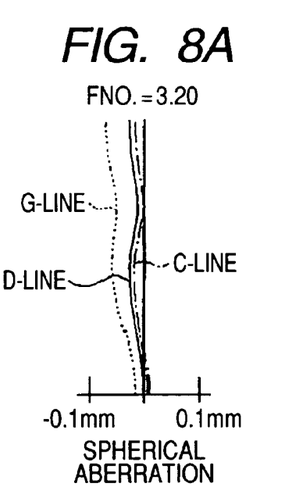
FIGS. 8A-8C are aberration diagrams showing various aberrations of the single focus lens of Example 1.
Figure 8B:
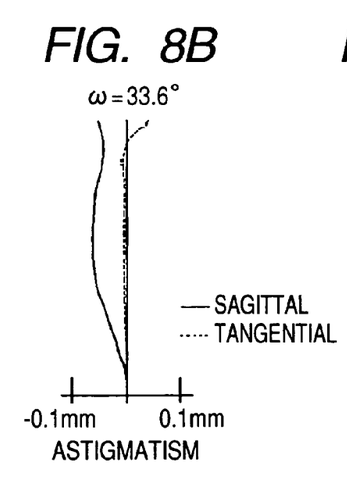
Figure 8C:
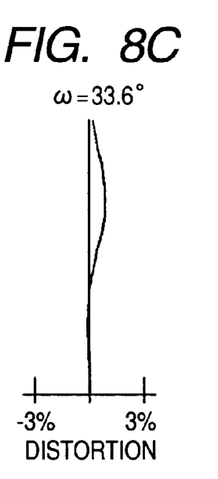
Figure 9A:
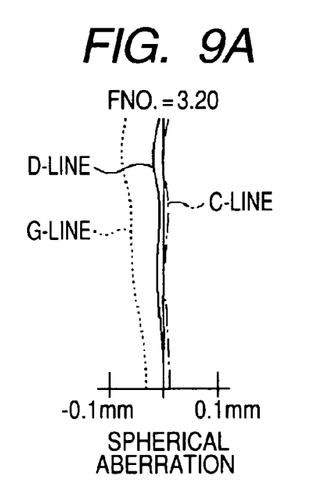
FIGS. 9A-9C are aberration diagrams showing various aberrations of the single focus lens of Example 2.
Figure 9B:
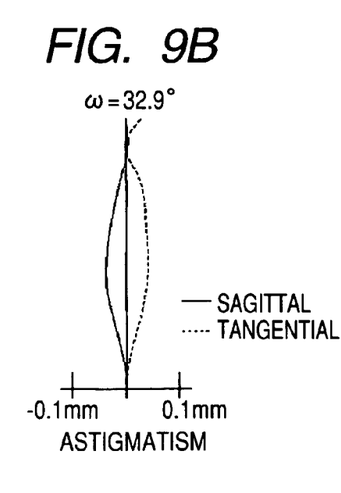
Figure 9C:
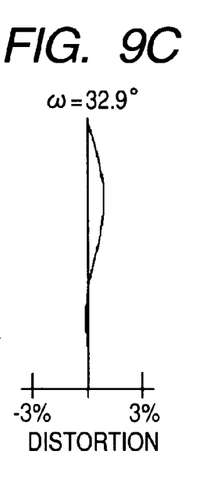

FIGS. 8A-8C show the spherical aberration, astigmatism, and distortion, respectively, of the single focus lens of Example 1. Each aberration diagram shows an aberration curve(s) at the d-line used as a reference wavelength. The spherical aberration diagram (FIG. 8A) also shows aberration curves at the g-line (wavelength: 435.8 nm) and the C-line (wavelength: 656.3 nm). In the astigmatism diagram (FIG. 8B), a solid-line aberration curve corresponds to the sagittal direction and a broken-line aberration curve corresponds to the tangential direction. The parameter ω represents the half angle of view. Likewise, FIGS. 9A-9C show the aberrations of the single focus lens of Example 2.

As seen from the above numerical value data and aberration diagrams, in each Example, the aberrations are corrected for properly and a compact lens system is realized though the number of lenses is small.

The invention is not limited to the above embodiment and Examples and various modifications are possible. For example, the values of the radii of curvature of the lens surfaces, the surface intervals, the refractive indices of the lenses, etc. are not limited to the values used in the above numerical value Examples and may have other values.

The present application claims foreign priority based on Japanese Patent Application No. JP2005-284712 filed Sep. 29, 2005, the contents of which is incorporated herein by reference.

What is claimed is:

1. A single focus lens comprising: in order from an object side of the single focus lens, a first lens having positive power and having a convex surface on the object side;

a second lens of a negative meniscus lens and having a concave surface of the object side on its paraxial axis; and a third lens of an aspherical lens having a convex surface on the object side on its paraxial axis, wherein the single focus lens satisfies conditions (1) to (7):

$$0.6 < f1/f < 1.5 \quad (1)$$

$$69 < vdA \quad (2)$$

$$24 < vdB < 32 \quad (3)$$

$$NdA < 1.55 \quad (4)$$

$$1.48 < NdB < 1.65 \quad (5)$$

$$L/D < 1.8 \quad (6)$$

$$0.30 < RA/f < 0.40 \quad (7)$$

wherein f represents a focal length of the single focus lens;
f1 represents a focal length of the first lens;
vdA represents Abbe number of the first lens;
vdB represents Abbe number of the second lens;
NdA represents a refractive index at the d-line of the first lens;
NdB represents a refractive index at the d-line of the second lens;
RA represents a paraxial radius of curvature of an object-side surface of the first lens;
L represents a distance along an optical axis between the object-side surface of the first lens and an image-forming position; and
D represents a maximum image height.

2. The single focus lens according to claim 1, further comprising a stop disposed, on the optical axis, in a position towards the object side, with respect to an image-side surface of the first lens.

3. The single focus lens according to claim 2, wherein the stop is disposed, on the optical axis, in a position towards the object side with respect to a portion which is on an object-side surface of the first lens and is closest to the image side.

4. The single focus lens according to claim 1, further comprising a stop disposed, on the optical axis, between an object-side surface of the first lens and an image-side surface of the first lens.

5. The single focus lens according to claim 1, wherein the first lens is an aspherical lens.

6. The single focus lens according to claim 1, wherein the second lens is an aspherical lens.

7. The single focus lens according to claim 1, wherein the first and second lenses are aspherical lenses.

8. The singe focus lens according to claim 1, wherein the first lens is an aspherical lens made of a glass material, and the second and third lenses are aspherical lenses made of a plastic material.

9. The single focus lens according to claim 1, wherein an object-side surface of the third lens is shaped such that its positive power decreases outward from the optical axis.

10. The single focus lens according to claim 1, wherein the image-side surface of the third lens is a concave surface on its paraxial axis, its negative power decreasing away from the center so that the power turns positive at a position further away from the center.

11. The single focus lens according to claim 1, wherein an optical member is disposed between the third lens and an imaging plane, and the parameter L is obtained using a thickness of the optical member that is air-converted.

12. The single focus lens according to claim 1, wherein the power in the single focus lens is increased by decreasing the radius of curvature of the front surface of the first lens, and the total length of the single focus lens is shortened.

13. The single focus lens according to claim 1, wherein the third lens is formed of a material with an Abbe number of 55 to 60.

14. The single focus lens according to claim 13, wherein the material of the third lens is an acrylic resin or a cycloolefin polymer.

15. A single focus lens comprising: in order from an object side of the single focus lens, a first lens having positive power and having a convex surface on the object side;

a second lens of a negative meniscus lens and having a concave surface of the object aide on its paraxial axis; and a third lens of an aspherical lens having a convex surface on the object side on its paraxial axis, wherein the single focus lens satisfies conditions (1), (6) and (7) for compactness:

$$0.6 < f1/f < 1.5 \quad (1)$$

$$L/D < 1.8 \quad (6)$$

$$0.30 < RA/f < 0.40 \quad (7)$$

wherein f represents a focal length of the single focus lens;
f1 represents a focal length of the first lens;
RA represents a paraxial radius of curvature of an object-side surface of the first lens;
L represents a distance along an optical axis between the object-side surface of the first lens and an image-forming position; and
D represents a maximum image height.

16. The single focus lens according to claim 15, wherein the lens materials of the first and second lenses and the power allocations to the first and second lenses are optimized for compactness and performance of the single focus lens.

17. The single focus lens according to claim 15, further comprising a stop disposed, on the optical axis, in a position towards the object side, with respect to an image-side surface of the first lens.

18. The single focus lens according to claim 14, wherein the first lens in the single focus lens satisfies conditions (2) and (4):

$$69 < vdA \quad (2)$$

$$NdA < 1.55 \quad (4)$$

wherein vdA represents Abbe number of the first lens, and NdA represents a refractive index at the d-line of the first lens.

19. The single focus lens according to claim 15, wherein the second lens in the single focus lens satisfies conditions (3) and (5):

$24 < vdB < 32$ (3)

$NdA < 1.55$ (4)

$1.48 < NdB < 1.65$ (5)

wherein vdB represents Abbe number of the second lens, and NdB represents a refractive index at the d-line of the second lens.

20. The single focus lens according to claim 15, wherein the first and second lenses are aspherical lenses.

21. The single focus lens according to claim 15, wherein
an object-side surface of the third lens is shaped such that its positive power decreases outward from the optical axis, and
the image-side surface of the third lens is a concave surface on its paraxial axis, its negative power decreasing away from the center so that the power turns positive at a position further away from the center.

22. The single focus lens according to claim 15, wherein the power in the single focus lens is increased by decreasing the radius of curvature of the front surface of the first lens, and the total length of the single focus lens is shortened.

23. A single focus lens comprising: in order from an object side of the single focus lens,
a first lens having positive power and having a convex surface on the object side;
a second lens of a negative meniscus lens and having a concave surface of the object side on its paraxial axis; and
a third lens of an aspherical lens having a convex surface on the object side on its paraxial axis,
wherein the single focus lens satisfies conditions (2)-(6):

$69 < vdA$ (2)

$24 < vdB < 32$ (3)

$NdA < 1.55$ (4)

$1.48 < NdB < 1.65$ (5)

$L/D < 1.8$ (6)

wherein
f represents a focal length of the single focus lens;
vdA represents Abbe number of the first lens
vdB represents Abbe number of the second lens;
NdA represents a refractive index at the d-line of the first lens;
NdB represents a refractive index at the d-line of the second lens;
L represents a distance along an optical axis between the object-side surface of the first lens and an image-forming position; and
D represents a maximum image height.

24. The single focus lens according to claim 23, further comprising a stop disposed, on the optical axis, in a position towards the object side, with respect to an image-side surface of the first lens.

25. The single focus lens according to claim 23, wherein the first and second lenses are aspherical lenses.

26. The single focus lens according to claim 23, wherein the third lens is formed of a material that has an Abbe number of 55 to 60.

* * * * *